(12) United States Patent
Paluch

(10) Patent No.: US 6,312,746 B2
(45) Date of Patent: *Nov. 6, 2001

(54) MULTICOMPONENT PET FOOD PRODUCT AND METHODS OF MAKING AND USING THE SAME

(75) Inventor: Laura Paluch, Yorba Linda, CA (US)

(73) Assignee: Kal Kan Foods, Inc., Vernon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/799,288

(22) Filed: Feb. 5, 2001

Related U.S. Application Data

(63) Continuation of application No. 09/570,646, filed on May 15, 2000, now Pat. No. 6,254,910, which is a continuation-in-part of application No. 09/040,399, filed on Mar. 18, 1998, now Pat. No. 6,117,477.

(51) Int. Cl.$^7$ ...................................................... A23K 1/00
(52) U.S. Cl. ........................ 426/282; 426/283; 426/450; 426/623; 426/635; 426/805
(58) Field of Search ..................................... 426/282, 283, 426/450, 623, 635, 805

(56) References Cited

U.S. PATENT DOCUMENTS

| | | |
|---|---|---|
| 3,916,029 | 10/1975 | Hildebolt . |
| 3,922,353 | 11/1975 | Bernotavicz . |
| 4,006,266 | 2/1977 | Bone et al. . |
| 4,025,260 | 5/1977 | Neel . |
| 4,032,665 | 6/1977 | Miller et al. . |
| 4,162,333 | 7/1979 | Nelson et al. . |
| 4,190,679 | 2/1980 | Coffee et al. . |
| 4,209,536 | 6/1980 | Dogliotti . |
| 4,260,635 | 4/1981 | Fisher . |
| 4,273,788 | 6/1981 | Bone et al. . |
| 4,364,925 | 12/1982 | Fisher . |
| 4,503,080 | 3/1985 | Brabbs et al. . |
| 4,508,741 | 4/1985 | Corbett et al. . |
| 4,569,848 | 2/1986 | Giorgetti et al. . |
| 4,574,690 | 3/1986 | Chiao et al. . |
| 4,610,884 | 9/1986 | Lewis, III et al. . |
| 4,752,484 | 6/1988 | Pflaumer et al. . |
| 4,762,723 | 8/1988 | Stong . |
| 4,777,058 | 10/1988 | Chandler et al. . |
| 4,784,860 | 11/1988 | Christensen et al. . |
| 4,795,655 | 1/1989 | Spiel et al. . |

(List continued on next page.)

FOREIGN PATENT DOCUMENTS

| | | |
|---|---|---|
| 0088574 | 9/1983 | (EP) . |
| 0862863 | 9/1998 | (EP) . |
| 59051692 | 10/1985 | (JP) . |
| 59200296 | 4/1986 | (JP) . |
| 9639869 | 12/1996 | (WO) . |

OTHER PUBLICATIONS

Klasje web page printout.
NASFT Fancy Food Shows web page printout.
The Manufacturing Confectioner; vol. 69, No. 10, pp. 65–69; 10/89.

(List continued on next page.)

Primary Examiner—Nina Bhat
(74) Attorney, Agent, or Firm—Fulbright & Jaworski L.L.P.

(57) ABSTRACT

A dual texture pet or animal food product having inner and outer components. The soft inner component contains a mixture of lipid and solid ingredients and has a water activity, $a_w$, less than about 0.65 and a total moisture content less than about 15 wt %. The outer component is a cereal based shell containing at least one ingredient comprising a carbohydrate, fat, protein or combination thereof, the shell component having a total moisture content less than about 20 wt %. The shell component completely surrounds the soft inner component and is formed by the co-extrusion of the soft inner component within the shell component to form one dual component pet or animal food product.

94 Claims, 1 Drawing Sheet

U.S. PATENT DOCUMENTS

| | | |
|---|---|---|
| 4,847,098 | 7/1989 | Langler . |
| 4,853,236 | 8/1989 | Langler . |
| 4,873,096 | 10/1989 | Spiel et al. . |
| 4,900,572 | 2/1990 | Repholz et al. . |
| 5,194,283 | 3/1993 | Dupas et al. . |
| 5,200,212 | 4/1993 | Axelrod . |
| 5,208,059 | 5/1993 | Dubowik et al. . |
| 5,223,292 | 6/1993 | Thulin et al. . |
| 5,435,714 | 7/1995 | Van Lengerich et al. . |
| 5,449,281 | 9/1995 | Dupart et al. . |
| 5,635,237 | 6/1997 | Greenberg et al. . |
| 5,641,529 | 6/1997 | Kunas . |
| 5,643,623 | 7/1997 | Schmitz et al. . |
| 5,695,797 | 12/1997 | Geromini et al . |
| 5,731,029 | 3/1998 | Karwowski et al. . |
| 5,919,451 * | 7/1999 | Cook et al. ................ 424/130.1 |

OTHER PUBLICATIONS

Food Engineering; vol. 65, No. 10, pp. 32–33; 10/93.
Cookie Chemistry and Technology; Ed. K. Kulp; American Institute of Baking; pp. 120–148, 280–292, and 326–414; 1994.
Baking & Snack; vol. 16, No. 1, pp. 49–51; 1/94.
APV Extruded/Filled Snacks Production Systems; product development case studies course handout; pp. 34–40; AACC Short Cource on Food Extrusion; Mar. 22–24, 1994.
Confectionery Production; p. 697; 9/95.
APV Budget Quotation; Ref. No. CCB960DD4; pp. 1, 7–8; Jan. 12, 1996.
Confectionery Production; p. 552; 7/96.
Kennedy's Confection; vol. 3, No. 11, p. 33; Nov. 27, 1996.
Cereal Foods World; 1996 AACC Annual Meeting Highlights; vol. 41, No. 11; pp. 822–824; 11–12/96.

* cited by examiner

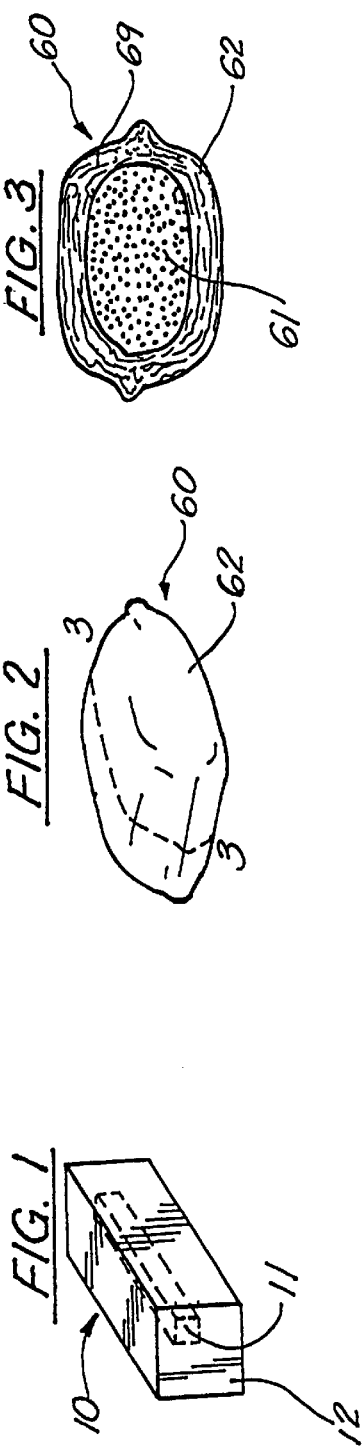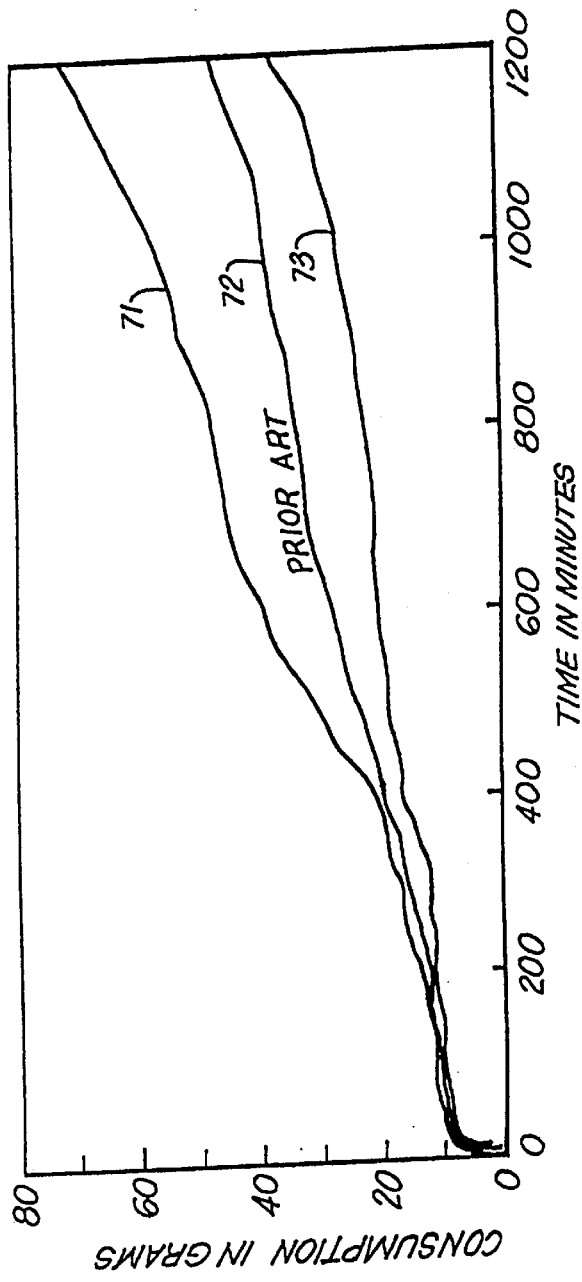

MULTICOMPONENT PET FOOD PRODUCT AND METHODS OF MAKING AND USING THE SAME

This application is a continuation of application Ser. No. 09/570,646 filed May 15, 2000 now U.S. Pat. No. 6,254,910, which is a continuation-in-part of U.S. Ser. No. 09/040,339, now U.S. Pat. No. 6,117,477 issued Sep. 12, 2000.

FIELD OF THE INVENTION

This invention relates to food products and, more particularly, to multicomponent dry pet or animal food products that significantly improve palatability.

BACKGROUND OF THE INVENTION

Semi-moist edible products are known in the art. Such products, for example, include those made by adding a water based soft component to a dry component. The water based component is typically stabilized using a variety of gelling agents, sugars, salts, glycols, and/or by using heat.

U.S. Pat. No. 4,190,679 describes a dual-textured pet food containing a soft moist meaty portion containing 5–25% moisture with a water activity of 0.5–0.90. U.S. Pat. No. 3,916,029 describes a center filled pet food having a semi-moist inner matrix in an outer pastry shell. The inner matrix has a moisture content of 15–40% by weight and a water activity below about 0.85. Antimycotic agents are required to prevent mold growth. U.S. Pat. No. 3,922,353 relates to a center filled product which has a meat based filling having a water activity greater than about 0.90 and a water content greater than about 50 % by weight. Pressure cooking, acidification and antimycotics are required. U.S. Pat. No. 4,006,266 relates to a two-component pet food having a soft component made of water, sugar, proteninanceous adhesive, animal protein source, vegetable protein source, fat, and a plasticizing agent. The soft component has between 11–14% moisture and a water activity of 0.60–0.75, and is subjected to elevated temperatures of 215–180° F. The above U.S. patents are herein incorporated by reference in their entirety.

U.S. Pat. No. 4,508,741 describes a pet food having a doubly coated core. The core is made primarily of a farinaceous material. U.S. Pat. No. 4,847,098 describes a dual textured food article having a relatively hard phase in contact with a relatively soft phase. The soft phase is a low fat content, water-in-oil emulsion made of a dispersed aqueous or syrup phase, at least one emulsifier, and a minor continuous oil phase. Ingredients for the soft portion include water, various grain and meat solids, propylene glycol, and high fructose corn syrup to help control water activity. U.S. Pat. No. 4,900,572 describes a dual textured pet food that is made by co-extrusion. The soft textured inner component is subjected to heat and pressure and has water added for expansion. U.S. Pat. No. 4,795,655 is a dual portion pet food in which an inner portion is softer than the outer hard dry portion. The soft portion contains egg solids, flour, meal, sugar and 30–40 wt % water. The finished product is baked to ensure stability. U.S. Pat. No. 4,364,925 is a dual textured dog chew designed to provide a long life bone that is molded into various shapes and may include baking to promote chewing. In this patent, cellulosic, collagen and protein fibers are combined with a cowhide derived binder to form a hard composition. The soft composition is not well defined. The above U.S. patents are herein incorporated by reference in their entirety.

U.S. Pat. No. 5,695,797 describes a coextruded pet food product in which the outer casing has a moisture content of between 20% and 40% and the filling represents between 30% and 40% of the total volume. The product requires a preservative such as phosphoric acid, an additive to lessen the action of the water, an anti-mould ingredient, and an antioxidant because the product of U.S. Pat. No. 5,695,797 has a high moisture content. The above U.S. patent is herein incorporated by reference in its entirety.

U.S. Pat. Nos. 5,641,529 and 5,449,281 describe various equipment for preparing shaped co-extruded products and three-dimensional shapes. The above U.S. patents are herein incorporated by reference in their entirety.

U.S. Pat. No. 4,273,788 describes a bulk mixture of hard and soft pet foods. The hard food is in the form of chunks and the soft food is in the form of slender strands. The soft strands are described as being semi-moist. Water is added to the soft composition prior to extrusion. The extruded composition is subject to an elevated temperature of approximately 215–280° F., thereby lowering the moisture content to about 11–14%. The above U.S. patent is herein incorporated by reference in its entirety. U.S. Pat. No. 4,574,690 describes an apparatus and process for producing a co-extruded food product having a filling food material surrounded by a molded food material. U.S. Pat. No. 4,025,260 describes a food extrusion capable of producing a curled food particle having a meat filling covered with dough. U.S. Pat. No. 5,208,059 describes an apparatus and a method to produce dual textured food pieces. The food pieces have cavities filled with a heated, pumpable food material. The above U.S. patents are herein incorporated by reference in their entirety.

U.S. Pat. No. 5,194,283 describes a composite cheese product having a covered core. The core is relatively softer than the outer covering layer. Both the outer layer and inner core are cheeses and thus are both high fat compositions. The inner core is made softer than the outer layer by increasing the fat content of the inner curd core. This U.S. patent is incorporated by reference in its entirety.

U.S. Pat. No. 5,643,623 and International Patent Publication No. WO 96/39869 describe a health food product containing a lipid based core used to deliver blends of anti-oxidants such as alpha-carotene, zeta-carotene, phytofluene, phytoene, vitamin C, vitamin E, or curcumin. The antioxidants are fat soluble and are incorporated into the lipid based core. The above U.S. patent and International patent publication are incorporated herein in their entirety.

The prior art products are not able to function as a delivery system for various nutritional, functional, or pharmaceutical additive ingredients because the prior art requires significant heat processes and/or acidic conditions would alter or destroy such additive. The present invention, however, does not utilize such harsh conditions. Furthermore, moisture must be controlled in the prior art in order to prevent the deterioration of the inherent nutritional ingredients from spoilage. However, as discussed above, more elaborate packaging materials and techniques, that are required for moisture control by the prior art, are not required by the present invention.

It is desirable to provide a palatable edible product without the use of water. As described above, conventional products use water to increase the palatability of dry pet or animal foods thereby creating semi-moist pet or animal food products. It would be highly advantageous to improve shelf-stability and other characteristics by avoiding the use of high levels of water in pet or animal food products.

Further, it would be desirable to provide a palatable edible product that functions as a delivery system for various nutritional, functional or pharmaceutical ingredients. Conventional products typically cannot deliver these ingredients because conventional products require significant heat processes and/or acidic conditions for stability. Such harsh conditions alter or destroy the delicate nutritional, functional, or pharmaceutical ingredients.

SUMMARY OF THE INVENTION

The present invention provides a shelf-stable multicomponent food product having improved palatability and methods of making and using the same. The shelf-stable multicomponent pet or animal food product of the present invention can function as a delivery system for process unstable or sensitive ingredients. The delivery system is a dual texture food product having a first component containing a mixture of lipid and solid ingredients forming a cream textured matrix, in which the first component is formed without an aqueous phase and a total moisture content less than about 15 wt %. The first component includes a process unstable or sensitive ingredient. A second component contains at least one ingredient comprising a carbohydrate, fat, protein or combination thereof, the second component has a total moisture content less than about 20 wt %. The second component completely surrounds the cream-textured matrix of the first component whereby maintaining the viability of the process unstable or sensitive ingredient. The food product delivery system is formed by the co-extrusion of the first component within the second component to form one dual component extrudate.

The present invention provides a dual component pet or animal food product from an edible inner component and an edible outer component. The inner component is a mixture of lipids and solids which forms a soft cream-like matrix. Since this soft matrix is formed without needing any added water, it has minimal water content and very low water activity levels. Consequently, the soft lipid composition does not require rigorous sterilization techniques or antimicrobial/antimycotic agents for stabilization. Nor does the soft lipid composition require any moisture control ingredients. The outer component is cereal based and is preferably harder than the inner portion. The outer component can have an aligned "fibrous" texture created via extrusion process.

The combination of the two components and textures provides an advantageous increase in palatability over the same compositional ingredients made into a mono-component product. Thus, surprisingly, the present invention provides a significant improvement in palatability by having a softer lipid based center surrounded by harder shell material.

Furthermore, the present invention allows the use of simple packaging techniques because, by the lipid inner matrix being surrounded by the cereal based shell, the lipid material is surprisingly protected from wicking through the shell. Accordingly, there is no wicking of lipids onto the packaging material for the dual component product of the present invention. Typically, high lipid content dry pet or animal foods wick onto packaging material thereby causing undesirable grease stains. The fact that the lipids are concentrated in the inner matrix and are surrounded by an outer shell component allows for the inner matrix to have a higher lipid content without wicking, than an unprotected lipid material of the prior art. Thus, the present invention provides a food component having a desirably high lipid concentration, yet still using simple packaging techniques, without any need for the specialized and costly packaging techniques usually associated with high lipid content products.

Additional objects, advantages and features of the various aspects of the present invention will become apparent from the following description of its preferred embodiments, such description being given in conjunction with the accompanying drawings.

BRIEF DESCRIPTION OF THE DRAWINGS

The invention will become more apparent when the detailed description of the exemplary embodiments is considered in conjunction with the appended drawings in which:

FIG. 1 is a perspective view of a pat or animal food product of the present invention;

FIG. 2 is a schematic perspective view of a pet or animal food product of the present invention;

FIG. 3 is a schematic sectional view, along section lines AA of FIG. 2, of a pet or animal food product of the present invention; and FIG. 4 is a graphical representation of the relationship between consumption and time comparing the palatability of a dual texture embodiment of the present invention with the palatability of two mono-texture products wherein the vertical axis represents consumption (grams) and the horizontal axis represents time (minutes).

DETAILED DESCRIPTION OF THE INVENTION

The invention provides a shelf-stable dual texture multi-component pet or animal food product containing a softer lipid based portion contained within a shell or harder matrix material portion having significantly improved palatability, as compared to mono-textured pet or animal food products. The present invention provides increased palatability yet the food is nutritionally complete according to American Feed Controls Officials (AFCO) standards.

One aspect of the invention provides a dual texture edible product having a lipid-containing softer portion and a cereal based harder portion. The softer component is preferably a mixture of lipids and solids which forms a soft cream textured matrix. Since this soft matrix has minimal water content and very low water activity levels, it does not require harsh sterilization techniques for preservation, additional ingredients for moisture control, or antimicrobial/antimycotic agents for stabilization. Ambient shelflife studies indicate that the product of the present invention is stable, while still maintaining superior feeding performance, even after one year. The cereal based component is preferably harder than the lipid-containing component.

According to one embodiment, the cereal based component forms a shell that surrounds the soft component which is in the form of an inner portion. Referring to FIG. 1, a pet or animal food product 10 includes an outer portion 12 surrounding an inner portion 11.

In one preferred embodiment of the invention, an extruded shell product includes an inner cream material pumped into a shell extruder die plate and distributed evenly within extruded ropes. The filled extruded ropes are then crimped and cut to form a shape known in the food and pet or animal food industry as "pillow" shapes. The extrusion product can utilize, without requiring the use of water, any convenient extrusion process and apparatus such as, for example, those presently utilized that until now, required the use of water to form semi-moist pet or animal food products.

In other examples, the extruded shell material can include up to 25% water added to the meal ingredient, prior to extrusion, to improve the extrusion process. However, the soft inner portion that is coextruded in the center of the extruded rope does not contain any added water. The amount of water added to the outer shell material does not require extreme heat for the water's removal because of the geometry of the extruded product. The water in this invention is only in the shell which is relatively thin compared to the overall thickness of the product. As a result, the water has a shorter pathlength to the surface, and can be driven off with relatively cooler temperatures and for shorter heating times. This is compared to the relatively longer path length for water in the prior art product that has water throughout the product, requiring hotter temperatures and longer heating times. Thus, the ingredients of the present invention are not subjected to deleteriously extreme heat conditions.

Referring to FIGS. 2 and 3, a pet or animal food product 60 has an outer portion 62 that surrounds an inner portion 61. The outer portion 62 may have an aligned "fibrous" texture 69 created by an extrusion process. It should be appreciated that the food products illustrated in the Figures can be in any convenient size and shape, including individual bite-sized pieces and other conventional confectionery food product sizes in shapes such as a square, rectangular, round, oval, spherical, elliptical or donut shape. It would be apparent to one in the art to determine the appropriate size and shape for any particular animal application.

The softer inner portion or component 61 is a lipid based composition having a low total moisture content less than about 25 wt %, advantageously less than about 20 wt %, more advantageously less than about 15 wt % moisture, even more advantageously less than about 12 wt %, still more advantageously less than 10 wt %, even still more preferably less than 8 wt %, and most preferably less than 6 wt %.

The softer inner portion or component 61 includes lipids such as, for example, long or medium chain saturated or unsaturated, non- di, or tri-acylglycerols. Other ingredients such as, for example, carbohydrates, fats, proteins, and combinations thereof can be included. Additional ingredients can be, for example, nutritive, non-nutritive compounds, or combinations thereof. Examples of nutritive compounds that can be included in the softer inner portion or component include mineral supplements, B vitamins, and mixtures thereof. Non-nutritive compounds can include, for example, herbal compounds, plant-based extracts or mixtures thereof. Further, the inner portion or component can include one or more antioxidant ingredients which may be nutritive or non-nutritive. Examples of nutritive antioxidants can include provitamin A carotenes, vitamin C, vitamin E, and mixtures thereof. Examples of provitamin A carotenes include all trans and cis beta-carotenes, all trans and cis alpha-carotenes, and all trans and cis gamma-carotenes. Examples of non-nutritive antioxidants can include non-provitamin A carotenes, anti-inflammatory agents, and mixtures thereof. Examples of non-provitamin A carotenes are zeta-carotene, trans lycopene, cis lycopenes, phytofluene, phytoene, and curcumin. Examples of anti-inflammatory agents can include a fatty acid, a turmeric extract such as curcumin, and mixtures thereof.

It is preferable that the softer inner portion or component has a water activity, a, less than about 0.65, more advantageous that a, be less than about 0.50, still more advantageous that $a_w$ be less than about 0.40, and most advantageous that a, be less than about 0.35.

It is preferable for the lipid content of the softer inner portion or component be greater than about 10% by weight, more advantageous that the lipid content be greater than about 15% by weight, still more advantageous that the lipid content be greater than about 20% by weight, and most advantageous that the lipid content be greater than about 30% by weight.

It is preferable for the inner portion or component to comprise about 40–90 wt % solids and about 10–60 wt % lipids; more advantageous for the inner portion or component to comprise about 50–80 wt % solids and about 20–50% lipids; and still more advantageous for the inner portion or component to comprise about 55–65 wt % solids and about 45–35 wt % lipids, with the sum of the wt % of solids and lipids, in all cases, not to exceed 100 wt %. It is most preferred for the inner portion or component to comprise about 60 wt % solids and 40 wt % lipids. The softer inner portion or component can include an additive such as nutritional compounds, functional compounds, pharmaceutical compounds, and mixtures thereof. Such additives can be effective to enhance pet skin or coat properties, improve breath odor, enhance the immune response functions, combat parasites, combat microbes or the additives can be an anti-inflammatory or antioxidant. For example a combination of such additives can include an anti-inflammant, and antioxidant, an anti-parasite, a breath freshener, a skin coat enhancer, or a mixture thereof.

The softer inner portion or component is in the proportion of about 5 to about 50 wt % of the total product. The harder outer portion or component is a composition having a low total moisture content that is less than about 25 wt %. The harder outer portion or component is a composition that preferably can include carbohydrates, fats, proteins, and combinations thereof.

An aspect of the invention provides a shelf-stable dual texture food product that functions as a delivery system for various functional, nutritional, and/or pharmaceutical ingredients. Preferably, the soft component serves as a delivery system for functional ingredients, especially those that are sensitive to heat, light, and oxygen. Since the soft component is totally encapsulated by the shell/matrix portion, the functional ingredients are substantially protected from heat, light and oxygen. Thus, one aspect of the invention provides a shelf-stable multicomponent pet or animal food product in which various functional, nutritional, and pharmaceutical ingredients can be added and protected in the center inner matrix from heat, light, and oxygen. Furthermore, some functional ingredients may exhibit an undesirable odor or color when mixed throughout a product. Full encapsulation substantially overcomes such problems. Additionally, the functional ingredients, which are generally fat soluble, by being contained in the lipid-based material are more easily absorbed in the digestive tract. Accordingly, they are more effectively administered.

Another aspect of the invention provides a product whereby the lipid inner matrix is surrounded by the cereal based shell which protects the lipid material from wicking, thereby allowing the use of simple packaging techniques.

The present invention provides a functional delivery system for skin and coat enhancement. For example, the functional ingredient in sunflower or safflower oil, linoleic acid, can be mixed into the lipid based center filling material at targeted levels of 4–8 g/400 Kcal. It is difficult to add this much sunflower or safflower oil to convention dry pet or animal foods because the added linoleic acid alters the extrusion parameters, which thereby causes undesirable changes in texture, increased manufacturing costs, and increased packaging material costs in order to minimize or prevent wicking of the oil. By contract, it is simple to incorporate linoleic acid into the lipid matrix portion of the present invention. Other ingredients such as, for example, sulfur amino acids can be added as part of the solids in the lipid matrix portion. Since these amino acids are heat sensitive, incorporation into the center filling, rather than passing through the elevated temperatures of conventional extruder processing, prevents degradation.

Another aspect of the present invention provides a functional delivery system for anti-inflammatory agents. For example, curcumin, can be added to the center filling material. Since this ingredient is bright yellow in color, addition of this ingredient to the outer shell makes the product an undesirable color. Addition of this ingredient in the center filling material hides the bright yellow color. Anti-inflammatory pharmaceutical ingredients may also be incorporated into the center filled material to control inflammation.

Yet another aspect of the present invention provides a functional delivery system for breath improvement agents. Ingredients such as rosemary, clove, and parsley seed oils can be added to the center filling material. Since these ingredients have strong flavors and aromas, mixing into a center filling material dampens the flavor and aroma of these functional ingredients and also allows for their increased stability.

The present invention also provides a functional delivery system for enhanced immune response agents. For example, evening primrose oil or echinacea can be added to the center filling material, thereby preventing their degradation and enhancing their stability.

Another aspect of the present invention provides a functional delivery system for antioxidant agents. There are various ingredients that can function as antioxidants including, for example, (i) vitamin E which is lipid soluble, thus easily and advantageously incorporated into the lipid matrix portion, and (ii) carotenoids which are a bright orange color and are heat, light and oxygen labile. These agents are thus advantageously incorporated into the center lipid matrix portion surrounded by an outer shell material.

The present invention farther provides a functional delivery system for parasite control agents. Pharmaceutical ingredients are currently incorporated into tablets. Such tablets are often difficult to administer. There is an increasing desire by consumers for incorporating these ingredients in a pet or animal food product for ease of administration. For example, pharmaceutical ingredients such as those effective against heartworm, intestinal worms, fleas, and/or ticks could be incorporated into the center lipid matrix portion of the present invention for easy administration.

Yet another aspect of the present invention provides a functional delivery system for antibiotics and/or prebiotics and/or probiotics for the maintenance of gastrointestinal health functions. Various antibiotics may be incorporated into the center lipid matrix portion. Prebiotics such as inulin or frutooligosaccharide (FOS) can be incorporated as part of the solids mix blended with the lipids. Probiotics, such as lyophilized lactobacillus or bifidobacterium can be added to the lipid which have higher survival rates than when incorporated into conventional pet or animal food products. This is because the harsh sterilization process of conventional or animal food manufacturing is not required in the present invention. The lyophilized cells can thus remain dormant in the lipid matrix of the present invention and remain protected until the cells reach the GI tract where they can advantageously proliferate.

The dual texture animal food product of the present invention can be of any convenient size suitable for a particular pet-type application. One of ordinary skill in the art knows what appropriate sizes are for particular pet-types such as, for example, kittens, cats, old cats, small dogs, medium size dogs, large dogs, and old dogs.

In one example, a dual texture animal food product of the present invention has a largest dimension less than about 20 mm and a second largest dimension less than about 15 mm. In another example, the largest dimension ranges from about 8 to about 10 mm and the second largest dimension ranges from about 8 to about 10 mm. Another has a largest dimension ranging from about 10 to about 12 mm and a second largest dimension ranging from about 14 to about 16 mm. Another has a largest dimension less than about 30 mm and a second largest dimension less than about 30 mm.

The dual texture animal food product of the present invention, in another example, is in the shape of a substantially rectilinear box having a first dimension ranging from about 7 to about 15 mm, a second dimension ranging from about 7 to about 15 mm and a third dimension ranging from about 3 to about 10 mm. In another example, the box shape has a first dimension ranging from about 15 mm to about 30 mm, a second dimension ranging from about 15 to about 30 mm and a third dimension ranging from about 5 mm to about 15 mm.

The dual texture animal food product of the present invention can be formed as having any convenient individual weight appropriate to the particular pet-type application. For example, in an example for cats, the products weighs from about 0.1 to about 10 grams per piece. The present invention also includes mixing different weight pieces for one pet food application as well as uniform weight pieces.

EXAMPLES

The following examples are illustrative of some of the products, and methods of making dual-textured products, falling within the scope of the present invention. Numerous changes and modification can be made with respect to the invention by one of ordinary skill in the art without undue experimentation.

In general, the specific processes, such as mixing, grinding, cooking, heating, extruding, or shell formation, used to make the pet or animal food products of the present invention are well known in the industry. Further, such safety procedures as are required to produce a suitable pet or animal food product are also well known in the art and are followed in practicing the present invention.

When using a digest, safe digest conditions are also well known, such as maintaining a pH between about 1.0 to about 5.0. In general, the harder, shell ingredients are blended uniformly in the presence of a magnet before milling, a de-stoner is used during milling, and the milled product is tested with a metal detector to remove any potential damaging and unhealthy metal pieces. The mill and sifter should be capable of producing, for a feline directed product, for example, a mean particle size from about $200\mu$ to about $300\mu$. Other animals would require different particle sizes, as is well known in the field. The sifter can be any convenient sifter such as, for example, an oscillating/vibrating bed sifter.

The safe handling of the softer core ingredients such as, for example, tallow, lard, digest, meat mix, and vegetable oil are also well known to one of ordinary skill in the pet or animal food industry. The storage conditions are well known such as, for example, keeping the tanks at a temperature between 45° C. to about 75° C. The tallow generally is preferably delivered from a bulk delivery system tempered to about 55° C. to about 65° C. The tallow is preferably filtered through a U.S. Standard No. 18 Mesh filter (1,000 micron maximum opening). Such procedures for tallow are well known in the industry in order to produce a suitable healthful pet or animal food product.

In general, it is recommended that the dry meal component of the inner cream matrix be added to the mixer first, followed by the tallow and other fat and oil ingredients during a batch operation process. Optionally, a continuous process can be used whereby the dry components of the inner cream matrix are simultaneously mixed with liquid tallow to form the cream. Additionally, an emulsifier can be added to the tallow prior to mixing. Airborne particulates, dust, and splashing should be minimized as is known in the art in order to produce a suitable healthful pet or animal food product. The cream material should be added and mixed until the dry ingredients are well mixed and coated with the fat and oil ingredients so that no dry material is observed. The absolute viscosity is preferably below about 25,000 cP in the temperature range of about 32° C. to about 50° C.

The cream tanks advantageously should be swept-surfaced and agitated, maintaining the product at a temperature of from about 40° C. to about 50° C. The agitators advantageously should be sized to prevent air entrapment from vortex formation. The speed of mixing advantageously should be controlled to prevent air entrapment from vortex formation. General procedures should be followed to prevent contamination from Salmonella and other microorganisms. Such procedures include, for example, maintaining sealed systems at positive pressure with filtered and UV treated air.

Any convenient method can be used to form the cream, to form the outer shell material, to load the materials into an extruder, and to co-extrude the outer and inner materials. Such methods are well known to one of ordinary skill in the art in using the compositions of the present invention to produce the product of the present invention.

It would be apparent to one of ordinary skill in the art the proper Theological properties necessary for the particular conventional extruder being used. The use of mills, screens, filters, temperature control devices, safety equipment, controllers, etc. are well known in the art. It would be apparent to one of ordinary skill in the art that the soft composition of the inner component of the present invention does not require addition of water for processing. The inner component of the present invention, however, should be kept at a temperature sufficiently low so that the mixture is sufficiently stiff, in order to allow its effective processing in conventional extrusion equipment.

It would be apparent to one in the art to prevent particles from damaging the equipment, or from being a hazard to the consumer, by removing such particles by any convenient method such as, for example, by filtering, screening, magnetic exclusion, and sedimentation.

Although any conventional extruder can be used, in one example, an extruder configured with a co-extrusion die configuration in a twin screw extruder was used. In one configuration, the product streams to the extruder included mixed meal, potable water, steam injection, pumpable meat inclusion, optionally tallow, and a corn oil extrusion-aid additive to form the shell. A preconditioner was used to prepare the meal for extrusion. In this case, although a small amount of water was added to the shell ingredients to aid in processing, the water was easily driven off by vaporization at the extrusion head or by low temperature drying at about 175° F. to about 250° F. (about 80° C. to about 116° C.) for about 20 minutes. The drying can be performed in two stages, about 10 minutes at about 175–220° F. (80–100° C.) followed by about 10 minutes at about 175–250° F. (80–116° C.). The inner lipid based portion has good heat insulating properties. Thereby, protecting the included ingredients from deterioration by the mild drying conditions.

The extruded rope containing the softer lipid interior material surrounded by the harder outer shell material can be divided into convenient sized pieces that are closed at the ends so that the softer lipid interior material is completely encased by the harder outer material. The dividing can be by any convenient process such as, for example, by using a crimper. Such crimpers are well known in the art.

Condensation onto the product stream should be avoided, and the process equipment should be chemically or steam sanitized. Other sanitary measures well known to one in the art should be followed in order to provide a healthy pet or animal food product.

Feeding performance is usually expressed in grams, representing the average intake per cat per feeding. If the feeding performance is performed over a period of days, the grams represent the average intake per cat per day. Feeding preference is usually expressed in percent, representing the average percentage of animals that preferred one food over others. The test procedures for determining feeding performance and feeding preferences are well known to one of ordinary skill in the art.

In the examples below, the term "Chix" refers to a common commodity for pet foods. It is a ground meal made from clean parts of carcasses of slaughtered chicken and is manufactured by many suppliers known to one in the industry.

Examples 1A, 1B

Comparative Example 1, and Comparative Example 2

Example 1A was a dual textured pet or animal food product of the present invention made with a shell composed of the ingredients shown in Table 1 and filled with the ingredients shown in Table 2:

TABLE 1

| Ingredient | Wt. % |
|---|---|
| Chix w. BHA | 29.00 |
| Corn whole, #2 Yellow | 39.18 |
| Rice Brewers | 17.00 |
| Soybean Meal 44% | 13.00 |
| Salt, iodized | 0.40 |
| Vitamins and Minerals | 0.80 |
| Antioxidant | 0.02 |
| Iron Oxide Colorant | 0.60 |

TABLE 2

| Ingredient | Wt. % |
|---|---|
| Wheat Flour | 10.00 |
| Hydrolyzed Meat Protein | 47.00 |
| Tallow Beef Inedible | 39.00 |
| Natural Colorant | 3.00 |
| Lecithin | 1.00 |

Example 1B was made similar to Example 1A but with the optional meat inclusion of beef, beef/liver blends and salmon. The meat inclusion was added to the shell at 5 wt % of the total product.

Comparative Example 1 was made by mixing all the ingredients, in the same amounts used to make Example 1, into one mono-textured pet or animal food product. Comparative Example 2 was just the shell ingredients. Referring to FIG. 4, the feeding performance for Example 1A is shown by a feeding curve 71. The feeding performance of the prior art Comparative Example 1 is shown by a feeding curve 72 for a mono-textured food product which contained in total the same ingredients as that used in Example 1A. The feeding performance of just the shell component of the present invention, Comparative Example 2, is shown by a feeding curve 73.

Example 1A and Comparative Example 1 were subjected to a Shelf-Life/Feeding Performance test. Example 1A showed feeding performances of 88 g intake after 14 weeks of shelf-storage, 75 g intake after 32 weeks of storage, and 78 g intake after 59 weeks of storage.

The data show the enhanced feeding performance for the dual texture Example 1A of the present invention when compared to a monocomponent product containing all the same ingredients (Comparative Example 1) or when compared to the outer shell only (Comparative Example 2). Not only was the present invention more palatable, but the present invention kept its increased palatability through a storage period of over a year.

Example 2 and 2B

A dual textured pet or animal food product of the present invention was made with a shell composed of the ingredients shown in Table 3 and filled with the ingredients shown in

TABLE 3

| Ingredient | Wt. % |
| --- | --- |
| Chix w. BHA | 34.00 |
| Corn whole, #2 Yellow | 36.18 |
| Rice Brewers | 15.00 |
| Soybean Meal 44% | 13.00 |
| Salt, iodized | 0.40 |
| EXP-04 | 0.80 |
| PET-OX (BHA/BHT) | 0.02 |
| Iron Oxide (Brown) | 0.40 |

TABLE 4

| Ingredient | Wt. % |
| --- | --- |
| Wheat Flour | 10.00 |
| Hydrolyzed Meat Protein | 47.00 |
| Tallow Beef Inedible | 39.00 |
| Natural Colorant | 3.00 |
| Lecithin | 1.00 |

At extrusion, the filled shell comprised 62.000 wt % batch meal, 8.000% meats, and 30.000% filling.

Example 2 showed enhanced feeding performances of 96 g after 6 weeks, 71 g after 26 weeks, and 88 g after 57 weeks. Example 2B was also made with the optional meat inclusion, similar to Example 1B.

Other feline preference feedings demonstrated a greater than 8 to 10 times rate of preference of the present invention over other dry products, including dry products containing high levels of lipids. In one comparison test, a salmon flavored example of the present invention was compared to a similarly salmon flavored comparison mono-textured example. The feeding preference of the present invention was 90.1% while the comparison example had a feeding preference of 9.9%.

In another comparison, using a beef flavored example of the present invention and a beef flavored comparison example, the present invention showed a feeding preference of 80.6% as compared to 19.4% for the comparison example. In yet another comparison, a 15 minute paired preference test showed, with 99% confidence, that the present invention example was preferred by 70.1% while the comparison example was preferred by 29.9% of the cats. The feeding performance was 41.8 g for the present invention example, compared to 17.7 g for the comparison example.

These results for dry pet or animal food, especially for feline feeding behavior, are surprising and unexpected. The increased palatability resulting from the lipid based inner matrix, according to the present invention, provides a delivery system, as shown by the following examples, for a variety of nutritional, functional, and pharmaceutical ingredients-especially those that are (i) lipid soluble, (ii) are susceptible to degradation by heat, light or oxygen or (iii) otherwise difficult to administer because of taste, color or odor.

The following examples show other embodiments of the present invention having an outer shell made with ingredients similar to that used in the above examples and having inner lipid softer mixtures as indicated below.

Example 3

Example 3 is made by producing the inner filling with the ingredients shown in Table 5 below:

TABLE 5

| Ingredient | Wt. % |
| --- | --- |
| Beef tallow | 38.9 |
| Animal and/or non-animal protein solids | 30 |
| Carbohydrate-based solids such as wheat flour | 30 |
| Emulsifier | 1 |
| Antioxidant | 0.1–5 |

Example 4

Example 4 is made by producing the inner filling with the ingredients shown in Table 6 below:

TABLE 6

| Ingredient | Wt. % |
| --- | --- |
| Beef tallow | 33.9–38–89 |
| Animal and/or non-animal protein solids | 30 |
| Wheat flour | 30 |
| Emulsifier | 1 |
| Antioxidant | 0.1 |
| Essential fatty acids such as n3 and/or n6 series | 0.1–5% |

Example 5

Example 5 is made by producing the inner filling with the ingredients shown in Table 7 below:

TABLE 7

| Ingredient | Wt. % |
| --- | --- |
| Beef tallow | 33.9–38.89 |
| Animal and/or non-animal protein solids | 30 |
| Wheat flour | 30 |
| Emulsifier | 1 |
| Antioxidant | 0.1 |
| n-3 series essential fatty acids and/or curcumin | .01–5% |

Example 6

Example 6 is made by producing the inner filling with the ingredients shown in Table 8 below:

TABLE 8

| Ingredient | Wt. % |
| --- | --- |
| Beef tallow | 34.9–38.89 |
| Animal and/or non-animal protein solids | 30 |
| Wheat flour | 30 |
| Emulsifier | 1 |
| Antioxidant | 0.1 |
| Vitamin E/Curcumin/Carotenes | 0.01–4% |

Example 7

Example 7 is made by producing the inner filling with the ingredients shown in Table 9 below:

TABLE 9

| Ingredient | Wt. % |
| --- | --- |
| Beef tallow | 36.9–38.89 |
| Animal and/or non-animal protein solids | 30 |
| Wheat flour | 30 |
| Emulsifier | 1 |
| Antioxidant | 0.1 |
| Rosemary, clove, eucalyptus and/or parsley seed oils | 0.01–2.0% |

Example 8

Example 8 is made by producing the inner filling with the ingredients shown in Table 10 below:

TABLE 10

| Ingredient | Wt. % |
| --- | --- |
| Beef tallow | 33.9–38.89 |
| Animal and/or non-animal protein solids | 30 |
| Wheat flour | 30 |
| Emulsifier | 1 |
| Antioxidant | 0.1 |
| Flax seed, evening primrose, brewers yeast and/or kelp | 0.01–5% |

Example 9

Example 9 is made by producing the inner filling with the ingredients shown in Table 11 below:

TABLE 11

| Ingredient | Wt. % |
| --- | --- |
| Beef tallow | 33.9–38.89 |
| Animal and/or non-animal protein solids | 30 |
| Wheat flour | 30 |
| Emulsifier | 1 |
| Antioxidant | 0.1 |
| Parasite control ingredients such as a dewormer or anti-flea agent | .01–5% |

Example 10

Example 10 is made by producing the inner filling with the ingredients shown in Table 12 below:

TABLE 12

| Ingredient | Wt. % |
| --- | --- |
| Chicken meal | 35.2% |
| Corn | 35% |
| Rice | 14% |
| Soybean meal | 13% |
| Salt | 0.4% |
| Vitamins/minerals/antioxidants/colors | 2.4% |

Example 11

Example 11 is made by producing the inner filling with the ingredients shown in Table 13 below:

TABLE 13

| Ingredient | Wt. % |
| --- | --- |
| Chicken meal | 15 |
| Rice | 25.3 |
| Corn | 25 |
| Wheat | 13.3 |
| Corn gluten meal | 12 |
| Salt | 0.9 |
| Milk protein | 1 |
| Yeast | 2 |
| Egg | 0.8 |
| Vitamins/minerals/antioxidants/colors | 4.7 |

As described above, the present invention provides a delivery system for ingredients that are process unstable or sensitive. Process unstable ingredients, for example, are those that become inactive due to the high heat, or acid levels present in most food processing techniques. Sensitive ingredients, for example, are those that are sensitive to light or oxygen. These unstable or sensitive ingredients can include functional, nutritional, pharmaceutical, prebiotic and probiotic ingredients.

The USP 24 NF Jul. 19, 1999, lists pharmaceutical ingredients and among many items discussed, lists the storage and stability conditions thus identifying those that are temperature, light, or oxygen sensitive. This publication is herein incorporated by reference in its entirety. It is also well known in the industry that vitamins are destroyed by exposure to heat, light, oxidizing agents, extremes in pH, or other factors that affect organic nutrients.

Probiotic micro-organisms are micro-organisms that beneficially affect a host by improving its intestinal microbial balance and as such as very heat sensitive. Typically probiotic micro-organisms will only remain viable at lower temperatures and in mixtures that have a low water activity. Examples of suitable probiotic micro-organisms include yeasts, such Saccharomyces, Debaromyces, Candida, Pichia and Torulopsis, moulds such as Aspergillus, Rhizopus, Mucor, and Penicillium and Torulopsis and bacteria such as the genera Bifidobacterium, Bacteroides, Clostridium, Fusobacterium, Melissococcus, Propionibacterium, Streptococcus, Enterococcus, Lactococcus, Staphylococcus, Peptostrepococcus, Bacillus, Pediococcus, Micrococcus, Leuconostoc, Weissella, Aerococcus, Oenococcus and Lactobacillus. Specific examples of suitable probiotic microorganisms are: *Saccharomyces cereviseae, Bacillus coagulans, Bacillus licheniformis, Bacillus subtilis, Bifidobacterium bifidum, Bifidobacterium infantis, Bifidobacterium longum, Enterococcus faecium, Enterococcus faecalis, Lactobacillus acidophilus, Lactobacillus alimentarius, Lactobacillus casei* subsp. *casei, Lactobacillus casei* Shirota, *Lactobacillus curvatus, Lactobacillus delbruckii* subsp. *lactis, Lactobacillus farciminus, Lactobacillus gasseri, Lactobacillus helveticus, Lactobacillus johnsonii, Lactobacillus reuteri, Lactobacillus rhamnosus* (Lactobacillus GG), *Lactobacillus sake, Lactococcus lactis, Micrococcus varians, Pediococcus acidilactici, Pediococcus pentosaceus, Pediococcus acidilactici, Pediococcus halophilus, Streptococcus faecalis, Streptococcus thermophilus, Staphylococcus carnosus,* and *Staphylococcus xylosus.*

A number of vitamins are also unstable. A summary of vitamin instability is described in chapter 8 of *Food Chemistry* by Owen Fennema (pp. 531–617), which is herein incorporated by reference in its entirety. As an example, Vitamin C (ascorbic acid) is a very unstable vitamin. It is unstable in both neutral and alkaline conditions and oxidizes readily upon exposure to air or oxygen, light and heat. The maximum cooking loss is 100%. *Food Chemistry* by Owen Fennema. Marcel Decker 1996, pg. 533.

Alternatively, lycopene is in a class of carotenoids that characteristically gives color to many vegetables. Lycopene is found in a highest concentration in tomatoes and tomato products. Carotenoids are easily isomerized by heat, acid or light. Once isomerized, they lose their biological antioxidant properties. *Food Chemistry* by Owen Fennema. Marcel Decker 1996, pg. 678.

It has also become increasingly popular in the food and pet food industry to combine and therefore process herbs and functional ingredients with other food components. There are many unknowns regarding interactions with these herbs and functional ingredients during processing with other food components. These unknowns consist of chemical reactions between the herb and functional ingredients that occur during processing or subsequent storage that may render the herb or functional ingredient non-effective. These chemical reactions are enhanced by factors such as heat, light, and oxygen. The reference *The Herbal Drugs and Phytopharmaceuticals, A Handbook for Practice on a Scientific Basis*, ed. and translation from the German Ed by Norman Grainger Bisset. CRC Press, 1994 describes herbs and other functional ingredients that includes preparation methods for these natural ingredients. This publication is herein incorporated by reference in its entirety. Historically, these herbs and functional ingredients are consumed individually, not combined or processed with other food ingredients. This invention provides a food component environment and processing conditions that minimize the potential for chemical reactions to occur between herbs and functional ingredients and food components.

Example 12

In Example 12, two different batches of animal food product were produced in which Vitamin C powder (non-encapsulated) was added to the dry meal powders and blended, The amount of Vitamin C powder added was an amount sufficient to provide approximately 500 to 520 mg/kg of Vitamin C in the finished food product. The dry powders/dry ingredients plus Vitamin C was blended with tallow form a cream. The blended cream was pumped to the head of the extruder die and then co-extruded with the shell material. The co-extruded ropes were crimped into pillow or pocket shapes and dried in a dryer. The dried animal food product was then coated with tallow and digest material. The Vitamin C enriched animal food product retained an average of 93.7% of the added Vitamin C, as determined by HPLC (high performance liquid chromatography). The results are shown in the table below:

TABLE 14

| Batch No. | Target Vitamin C | Actual Vitamin C |
|---|---|---|
| No. 1 | 500–520 mg/kg | 447 mg/kg |
| No. 2 | 500–520 mg/kg | 515 mg/kg |
| Average Vitamin C | | 478 mg/kg |

As show above, the duel component animal food product of the present invention retained 93.7% of the added Vitamin C after processing, which is significantly greater than the 0% retention of Vitamin C found in a moncomponent pet food produced by an extrusion process.

Example 13

In Example 13, two different batches of animal food product were produced in which an encapsulated product containing 5% lycopene was added to the dry meal powders and blended, The lycopene was supplied form ROCHE as an encapsulated product because encapsulation protects the lycopene from isomerization due to light and heat. ROCHE has found that about 80% of the lycopene is lost through the extrusion process. The amount of lycopene added was an amount sufficient to provide approximately 105 to 115 $\mu g/g$ of lycopene in the finished food product. The dry powders/dry ingredients plus lycopene was blended with tallow form a cream. The blended cream was pumped to the head of the extruder die and then co-extruded with the shell material. The co-extruded ropes were crimped into pillow or pocket shapes and dried in a dryer. The dried animal food product was then coated with tallow and digest material. The lycopene enriched animal food product retained an average of 68% of the added lycopene determined by HPLC (high performance liquid chromatography). The results are shown in the table below in which the actual lycopene is non isomerized or trans lycopene.

TABLE 15

| Batch No. | Target Lycopene | Actual trans lycopene |
|---|---|---|
| No. 1 | 105–115 $\mu g/g$ | 71.6 $\mu g/g$ |
| No. 2 | 105–115 $\mu g/g$ | 78.0 $\mu g/g$ |
| Average lycopene | | 74.8 $\mu g/g$ |

As shown above, the duel component animal food product of the present invention retained 68% of the added lycopene after processing, which is significantly greater than the 20% retention of lycopene found in a moncomponent pet food produced by an extrusion process.

Example 14

In Example 14, two different batches of animal food product, Formulation A and B, were produced in which three different probiotic micro-organisms were added to the dual component animal product. One kibble mixture was dried and the other was not subject to drying. Suitable probiotic micro-organisms are well known to those skilled in the art. The micro-organisms used in Example 14 were *Bacillus coagulans, Enterococcus faecium* and *Streptococcus thermophilus* which were supplied by Chr. Hansen's Biosystems, 9015 West Maple, Milwaukee, Wis. 53214. The probiotic micro-organisms are preferably in powdered, dried form; especially in spore form if the micro-organism forms spores. The probiotic micro-organism can also be encapsulated to further increase the probability of survival.

The amount of *Bacillus coagulans, Enterococcus faecium* and *Streptococcus thermophilus* added to the cream mixture portion of the dual component animal food was twelve million CFU's/gram, this resulting in a target of 100,000 CFU's/liter of intestinal fluid per organism. The blended cream was pumped to the head of the extruder die and then co-extruded with the shell material. The co-extruded ropes were crimped into pillow or pocket shapes and dried in a dryer. The dried animal food product was then coated with tallow and digest material. The amount of probiotic micro-organisms retained in the animal food product was determined by viable plate counts(VPC) and reported as CFU/g with standard deviations included. The results are shown in Tables 16 and 17 below.

TABLE 16

| Formulation A Lot 15030A | Target VPC | *Bacillus coagulans* (CFU/g) (% recovery) | | *Enterococcus faecium* (CFU/g) (% recovery) | |
|---|---|---|---|---|---|
| Kibble (no dry) | 29 × 10E5 | 35 ± 5 × 10E5 | 121 | 6.2 ± 0.8 × 10E5 | 21 |
| Kibble (dried) | 29 × 10E5 | 28 ± 2 × 10E5 | 97 | 0.2 ± 0.1 × 10E5 | 0.6 |

TABLE 17

| Formulation B Lot 15030B | Target VPC | *Bacillus coagulans* (CFU/g) (% recovery) | | *Streptococcus Thermophilus* (CFU/g) (% recovery) | |
|---|---|---|---|---|---|
| Kibble (no dry) | 29 × 10E5 | 27 ± 2 × 10E5 | 93 | 8.2 ± 2.0 × 10E5 | 28 |
| Kibble (dried) | 29 × 10E5 | 29 ± 1 × 10E5 | 100 | 11.5 ± 1.3 × 10E5 | 40 |

As shown above the probiotic micro-organisms remain extremely stable in the duel component animal food product of the subject invention.

In general, the proximate weight percent of elements for the lipid center matrix of Examples 3–11 would be 36 wt % protein, 6 wt % ash, 42 wt % fat, 10 wt % carbohydrate, and 6 wt % moisture. The proximate weight percent for the raw batch meal used in the outer shell prior to extrusion is about 13 wt % protein, 7 wt % ash, 6wt % fat, 4 wt % fiber, 40 wt % carbohydrate, and 10 wt % moisture. Fresh meat can be optionally added to the batch meal prior to extrusion. The protein/carbohydrate ratio would be adjusted to accommodate the meat addition, but the meat would nonetheless raise the fat content. The final product would have a moisture content less than about 12 wt % and a water activity below 0.6.

One skilled in the art will readily appreciate that the present invention is well adapted to carry out the objects and obtain the ends and advantages mentioned as well as those inherent therein. The dual component animal food described herein are presently representative of the preferred embodiments, are exemplary and are not intended as limitations on the scope of the invention. Changes therein and other uses will occur to those skilled in the art which are encompassed within the spirit of the invention and are defined by the scope of the claims.

What is claimed is:

1. A dual texture pet or animal food product comprising:
   a soft inner component of a dual texture pet or animal food product containing a mixture of lipid and solid ingredients, the first component having a water activity, $a_w$, less than about 0.65 and a total moisture content less than about 15 wt %;
   a cereal based shell component of the dual texture pet or animal food product containing at least one ingredient comprising a carbohydrate, fat, protein or combination thereof, the shell component having a total moisture content less than about 20 wt %;
   wherein the shell component completely surrounds the soft inner component and is formed by the co-extrusion of the soft inner component within the shell component to form one dual component pet or animal food product.

2. The dual texture food product of claim 1 wherein the lipid ingredient is beef tallow.

3. The dual textured product of claim 1, wherein the for product is for a dog.

4. The dual texture food product of claim 1, wherein the food product is for a cat.

5. The dual texture food product of claim 1, wherein the total moisture content of the first component is between about 8 to 12 wt %.

6. The dual texture food product of claim 1, wherein the total moisture content of the second component is between about 10 to 12 wt %.

7. The dual texture food product of claim 1, wherein the first component has a water activity, $a_w$, between about 0.35 to <0.65.

8. The dual texture food product of claim 1, wherein the lipid content of the first component is between about 10 to 30 wt % of the first component.

9. The dual texture food product of claim 1, wherein the lipid content of the first component is greater than about 30 wt % of the first component.

10. The dual texture food product of claim 1, wherein the first component comprises about 20 to 40 wt % of the dual texture food product.

11. The dual texture food product of claim 1, wherein the mixture of lipids and solids includes a lipid comprising a long- or medium-chain saturated or unsaturated, mono- di- or tri-acylglycerols.

12. The dual texture food product of claim 1, wherein the first component further includes an ingredient selected from the group consisting of carbohydrates, fats, proteins and combinations thereof.

13. The dual texture food product of claim 1, wherein the first component further contains at least one additional ingredient selected from the group comprising nutritive compounds, non-nutritive compounds, functional compounds, pharmaceutical compounds and mixtures thereof.

14. The dual texture food product of claim 13, wherein the nutritive compounds are selected from the group comprising mineral supplements, vitamin supplements and mixtures thereof.

15. The dual texture food product of claim 13, which the non-nutritive compounds are selected from the group comprising herbal compounds, plant-based extracts and mixtures thereof.

16. The dual texture food product of claim 1, wherein the second component includes the ingredients of a carbohydrate, a fat and a protein.

17. A dual texture pet or animal food product comprising:
   a first component of a dual texture pet or animal food product containing a mixture of lipid and solid ingredients creating a cream-textured matrix, the first component having a water activity, $a_w$, of less than about 0.65 and a total moisture content less than about 15 wt %;
   a second component of the dual texture pet or animal food product containing at least one ingredient comprising a carbohydrate, fat, protein or combination thereof, the second component having a total moisture content less than about 20 wt %;
   wherein the second component completely surrounds the cream-textured matrix of the first component and is formed by the co-extrusion of the first component within the second component to form one dual component pet or animal food product.

18. The dual texture food product of claim 17, wherein the lipid ingredient is beef tallow.

19. The dual texture food product of claim 17, wherein the food product is for a dog.

20. The dual texture food product of claim 17, wherein the food product is for a cat.

21. The dual texture food product of claim 17, wherein the total moisture content of the first component is between about 8 to 12 wt %.

22. The dual texture food product of claim 17, wherein the total moisture content of the second component is between about 10 to 12 wt %.

23. The dual texture food product of claim 17, wherein the first component has a water activity, $a_w$, between about 0.35 to <0.65.

24. The dual texture food product of claim 1, wherein the lipid and solid ingredients form a cream textured matrix.

25. A dual texture food product comprising:
   a soft inner component completely surrounded by a cereal based shell component, the dual texture pet food product being formed by the co-extrusion of the soft inner component within the shell component to form one dual component pet food product;
   wherein the soft inner component contains a mixture of lipid and solid ingredients forming a cream textured matrix, the inner component having a total moisture content less than about 15 wt %; and
   wherein the cereal based shell component contains at least one ingredient comprising a carbohydrate, fat, protein or combination thereof, the shell component having a total moisture content less than about 20 wt %.

26. The dual texture food product of claim 25, wherein the lipid ingredient is beef tallow.

27. The dual texture food product of claim 25, wherein the total moisture content of the first component is between about 8 to 12 wt %.

28. The dual texture food product of claim 25, wherein the total moisture content of the second component is between about 10 to 12 wt %.

29. The dual texture food product of claim 25, wherein the first component has a water activity, $a_w$, between about 0.35 to <0.65.

30. The dual texture food product of claim 25, wherein the lipid content of the first component is between about 10 to 30 wt % of the first component.

31. The dual texture food product of claim 25, wherein the lipid content of the first component is greater than about 30 wt % of the first component.

32. The dual texture food product of claim 25, wherein the first component comprises about 20 to 40 wt % of the dual texture food product.

33. The dual texture food product of claim 25, wherein the mixture of lipids and solids includes a lipid comprising a long- or medium-chain saturated or unsaturated, nono-, di- or tri-acylglycerols.

34. The dual texture food product of claim 25, wherein the first component further includes an ingredient selected from the group consisting of carbohydrates, fats, proteins and combinations thereof.

35. The dual texture food product of claim 25, wherein the first component further contains at least one additional ingredient selected from the group comprising nutritive compounds, non-nutritive compounds, functional compounds, pharmaceutical compounds and mixtures thereof.

36. The dual texture food product of claim 35, wherein the nutritive compounds are selected from the group comprising mineral supplements, vitamin supplements and mixtures thereof.

37. The dual texture food product of claim 35, wherein the non-nutritive compounds are selected from tho group comprising herbal compounds, plant-based extracts and mixtures thereof.

38. The dual texture food product of claim 25, wherein the second component includes the ingredients of a carbohydrate, a fat and a protein.

39. The dual texture food product of claim 25, wherein the food product is for a dog.

40. The dual texture food product of claim 25, wherein the food product is for a cat.

41. A dual texture food product comprising:
   a lipid-based inner component completely surrounded by a cereal based shell component, the dual texture pet food product being formed by the co-extrusion of the lipid-based inner component within the shell component to form one dual component pet food product;
   wherein the first lipid-based inner component containing a mixture of lipid and solid ingredients forming a cream textured matrix;
   wherein the cereal based shell component containing at least one ingredient comprising a carbohydrate, fat, protein or combination thereof; and
   wherein the dual component pet food product provides for a feeding preference of at least a 110% increase in grams consumed of the pet food product per a feeding time of 1200 minutes over the consumption of a mono-textured pet food product per an equivalent feeding time.

42. The dual texture food product of claim 41, wherein the lipid ingredient is beef tallow.

43. The dual texture food product of claim 41, wherein to food product is for a dog.

44. The dual texture food product of claim 41, wherein the food product is for a cat.

45. The dual texture food product of claim 41, wherein the first component has a total moisture content of less than about 15 wt %.

46. The dual texture food product of claim 45, wherein the total moisture content of the first component is between about 8 to 12 wt %.

47. The dual texture food product of claim 41, wherein the second component has a total moisture content of less than about 20 wt %.

48. The dual texture food product of claim 41, wherein the total moisture content of the second component is between about 10 to 12 w %.

49. The dual texture food product of claim 41, wherein the first component has a water activity, $a_w$, between about 0.35 to <0.65.

50. The dual texture food product of claim 41, wherein the lipid content of the first component is between about 10 to 30 wt % of the first component.

51. The dual texture food product of claim 41, wherein the lipid content of the first component is greater than about 30 wt % of the first component.

52. The dual texture food product of claim 41, wherein the first component comprises about 20 to 40 wt % of the dual texture food product.

53. The dual texture food product of claim 41, wherein the mixture of lipids and solids includes a lipid comprising a long- or medium-chain saturated or unsaturated, mono-, di-or tri-acylglycerols.

54. The dual texture food product of claim 41, wherein the mono-textured pet food product is formed by mixing the same ingredients in the same amounts as used to form the dual texture pet food product and extruding the ingredients into a mono-textured pet food product.

55. The dual texture food product of claim 41, wherein the mono-textured pet food product is formed by mixing together 29.0 wt. % Chix W. BHA/BHT, 39.18 wt. % corn whole #2 yellow, 17.0 wt. % rice brewers, 13.0 wt. % soybean meal (44%), 0.40 wt. % salt, 0.80 wt. % vitamins and minerals, 0.02 wt. % antioxidant, 0.60 wt. % iron oxide colorant, 10.0 wt. % wheat flour, 47 wt. % hydrolyzed meat protein, 39.0 wt. % tallow beef inedible, 3.0 wt. % natural colorant and 1.0 wt. % lecithin and extruding the ingredients into a mono-textured pet food product.

56. The dual texture food product of claim 41, wherein to mono-textured pet food product is formed by mixing together 29.0 wt. % Chix W. BHA/BHI, 39.18 wt. % corn whole #2 yellow, 17.0 wt. % rice brewers, 13.0 wt. % soybean meal (44%), 040 wt. % salt, 0.80 wt. % vitamins and minerals, 0.02 wt. % antioxidant, and 0.60 wt. % iron oxide colorant and extruding the ingredients into a mono-textured pet food product.

57. A delivery system for process unstable or sensitive ingredients comprising:
  a dual texture pet food product having a first component completely surrounded by a second component, the dual texture pet food product being formed by the co-extrusion of the first component within the second component to form one dual component pet pet food product,
  wherein the first component containing a mixture of lipid and solid ingredients creating a cream-textured matrix, the first component having a total moisture content less ta about 15 wt %;
  wherein the first component further containing at least one process unstable or sensitive ingredient;
  wherein the second component containing at least one ingredient comprising a carbohydrate, fat, protein or combination thereof, the second component having a total moisture content less than about 20 wt %; and
  wherein the viability of the at least on process unstable or sensitive ingredient is maintained by the second component completely surrounding the cream-textured matrix of the first component.

58. The delivery system of claim 57, wherein a process unstable or sensitive ingredient is an ingredient that becomes inactive due to high heat, acid levels, light or oxygen.

59. The delivery system of claim 57, wherein the process unstable or sensitive ingredients are selected from a group consisting of functional, nutritional, pharmaceutical, prebiotic and probiotic ingredients.

60. The delivery system of claim 57, wherein the total moisture content of the first component is between about 8 to 12 wt %.

61. The delivery system of claim 57, wherein the total moisture content of the second component is between about 10 to 12 wt %.

62. The delivery system of claim 57, wherein the first component has a water activity, $a_w$, between about 0.35 to <65.

63. The delivery system of claim 57, wherein the lipid content of the first component is between about 10 to 30 wt % of the first component.

64. The delivery system of claim 57, wherein the lipid content of the first component is greater than about 30 wt % of the first component.

65. The delivery system of claim 57, wherein the first component comprises about 20 to 40 wt % of the pet food product.

66. The delivery system of claim 57, wherein the mixture of lipids and solids includes a lipid comprising a long- or medium-chain saturated or unsaturated, mono-, di- or tri-acylglycerols.

67. The delivery system of claim 57, wherein the first component further includes an ingredient selected from the group consisting of carbohydrates, fats, proteins and combinations thereof.

68. The delivery system of claim 57, wherein the first component further contains at least one additional ingredient selected from the group comprising nutritive compounds, non-nutritive compounds, functional compounds, pharmaceutical compounds and mixtures thereof.

69. The delivery system of claim 68, wherein the nutritive compounds are selected from the group comprising mineral supplements, vitamin supplements and mixtures thereof.

70. The delivery system of claim 68, wherein the non-nutritive compounds are selected from the group comprising herbal compounds, plant-based extracts and mixtures thereof.

71. The delivery system of claim 57, wherein the mixture of ingredients of the first component includes at least one antioxidant ingredient.

72. The delivery system of claim 57, wherein the mixture of ingredients of the first component includes at least one ant-inflammatory agent.

73. The delivery system of claim 57, wherein the mixture of ingredients of the first component includes at least an antibiotic, a prebiotic or a probiotic agent.

74. The delivery system of claim 57, wherein the mixture of ingredient of the first component includes at least one compound selected from the group comprising a compound that functions to enhance animal skin and/or coats, a compound that functions to enhance antioxidant activity, a compound that functions to enhance anti-inflammatory agents, a compound that functions to enhance immune responses, a compound that improves animal breath, and a compound that functions as an anti-parasitic agent.

75. The delivery system of claim 57, wherein the second component includes the ingredients of a carbohydrate, a fat and a protein.

76. The delivery system of claim 57, wherein the food product is for a dog.

77. The delivery system of claim 57, wherein the food product is for a cat.

78. A dual texture food product comprising:
a first lipid-based component completely surrounded by a second cereal based component, the dual texture pet food product being formed by the co-extrusion of the first lipid-based component within the second cereal based component to form one dual component pet food product;
wherein the first lipid-based component containing a mixture of lipid and solid ingredients forming a cream textured matrix, the first component having a total moisture content of less than about 15 wt %; and
wherein the second cereal based component containing at least one ingredient comprising a carbohydrate, ft or protein or combination thereof, the second component having a total moisture content less than about 20 wt %.

79. The dual texture food product of claim 78, wherein the lipid ingredient is beef tallow.

80. The dual texture food product of claim 78, wherein the mixture of lipids and solids includes a lipid comprising a long- or medium-chain saturated or unsaturated, mono-, di-or tri-acylglycerols.

81. The dual texture food product of claim 78, wherein the first component further includes an ingredient selected from the group consisting of carbohydrates, fats, proteins and combinations thereof.

82. The dual texture food product of claim 78, wherein the food product is for a dog.

83. The dual texture food product of claim 78, wherein the food product is for a cat.

84. The dual texture food product of claim 78, wherein the total moisture content of the first component is between about 8 to 12 wt %.

85. The dual texture food product of claim 78, wherein the total moisture content of the second component is between about 10 to 12 wt %.

86. The dual texture food product of claim 78, wherein the first component has a water activity, $a_w$, between about 0.35 to <0.65.

87. The dual texture food product of claim 78, wherein the lipid content of the first component is greater than about 30 wt % of the first component.

88. The dual texture food product of claim 78, wherein the first component comprises about 20 to 40 wt % of the dual texture food product.

89. A dual texture food product produced by a process comprising the steps of:
forming a first component of a dual texture pet food product containing a mixture of lipid and solid ingredients that create a cream-textured matrix, the first component being formed with a total moisture content less than about 15 wt %;
forming a second component of the dual texture pet food product containing at least one ingredient comprising a carbohydrate, fat, protein or combination thereof, the second component being formed with a total moisture content less than about 20 wt %; and
co-extruding the first component within the second component to form one dual texture pet food product wherein the second component completely surrounds the cream-textured matrix of the first component.

90. The dual texture food product of claim 89, wherein the food product is for a dog.

91. The dual texture food product of claim 89, wherein the food product is for a cat.

92. A dual texture food product produced by a process comprising the steps of;
forming a first component of a dual texture pet food product containing a mixture of lipid and solid ingredients that create a cream-textured matrix, the first component being formed with a total moisture content less than about 15 wt %;
forming a second component of the dual texture pet food product containing at least one ingredient comprising a carbohydrate, fat, protein or combination thereof, the second component being formed with a total moisture content less than about 20 wt %; and
pumping the first component within the second component at a die head location of a co-extruder in order to avoid significant heat processing of the first component, thereby forming one dual component pet food extrudate, wherein the second component completely surrounds the cream-textured matrix of the first component.

93. The dual texture food product of claim 92, wherein the food product is for a dog.

94. The dual texture food product of claim 92, wherein the food product is for a cat.

* * * * *

UNITED STATES PATENT AND TRADEMARK OFFICE
CERTIFICATE OF CORRECTION

PATENT NO. : 6,312,746 B1
DATED : November 6, 2001
INVENTOR(S) : Laura Paluch

It is certified that error appears in the above-identified patent and that said Letters Patent is hereby corrected as shown below:

<u>Title page,</u>
Item [22], Filed: "Feb. 5, 2001" should read -- March 5, 2001 --

<u>Column 5,</u>
Lines 59, 60 and 62, ",a," should read -- ,$a_w$, --

<u>Column 6,</u>
Line 61, "convention" should read -- conventional --

<u>Column 8,</u>
Line 57, "2001μ" should read -- 200μ --

<u>Column 9,</u>
Line 40, "Theological," should read -- rheological --

<u>Column 11,</u>
Line 33, "shown in," should read -- shown in Table 4: --

<u>Column 18,</u>
Line 27, "claim 1 wherein" should read -- claim 1, wherein --
Line 29, "for product" should read -- food product --

<u>Column 19,</u>
Line 1, "claim 13, which" should read -- claim 13, wherein --
Line 59, "wherein tho" should read -- wherein the --

<u>Column 20,</u>
Line 10, "unsaturated, nono" should read -- unsaturated, mono --
Line 27, "selected from tho" should read -- selected from the --
Line 44, "the first lipid-based" should read -- the lipid-based --

<u>Column 21,</u>
Line 22, "di-or" should read -- di- or --
Line 30, "Chix W." should read -- Chix w. --
Line 38, "wherein to" should read -- wherein the --
Line 40, "Chix W. BHA/BHI" should read -- Chix w. BHA/BHT --
Line 42, "(44%), 040 wt" should read -- (44%), 0.40 wt --
Line 52, "pet pet food" should read -- pet food --
Line 57, "ta about 15 wt%" should read -- than about 15 wt% --
Line 64, "on process unstable" should read -- one process unstable --

UNITED STATES PATENT AND TRADEMARK OFFICE
CERTIFICATE OF CORRECTION

PATENT NO.   : 6,312,746 B1
DATED        : November 6, 2001
INVENTOR(S)  : Laura Paluch It is certified that error appears in the above-identified patent and that said Letters Patent is hereby corrected as shown below:

<u>Column 22,</u>
Line 15, "<65." should read -- <0.65. --
Line 50, "ant-inflammatory" should read -- anti-inflammatory --
Line 55, "of ingredient" should read -- of ingredients --

<u>Column 23,</u>
Line 15, "carbohydrate, ft or" should read -- carbohydrate, fat or --
Line 24, "di-or" should read -- di- or --

<u>Column 24,</u>
Line 15, "pet food product" should read -- pet food product, --
Line 23, "the steps of;" should read -- the steps of: --

Signed and Sealed this

Fourteenth Day of May, 2002

*Attest:*

*Attesting Officer*

JAMES E. ROGAN
*Director of the United States Patent and Trademark Office*

UNITED STATES PATENT AND TRADEMARK OFFICE
Certificate

Patent No. 6,312,746 B2                                                Patented: November 6, 2001

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Laura Paluch, Yorba Linda, CA; Michael Wilson, Los Angeles, CA; John Thamm, St. Joseph, MI; and Dan Beyer, Los Angeles, CA.

Signed and Sealed this Thirteenth Day of May 2003.

EDWARD LOOK
*Supervisory Patent Examiner*
Art Unit 3745